United States Patent
Kadansky et al.

(10) Patent No.: US 6,658,004 B1
(45) Date of Patent: Dec. 2, 2003

(54) USE OF BEACON MESSAGE IN A NETWORK FOR CLASSIFYING AND DISCARDING MESSAGES

(75) Inventors: Miriam C. Kadansky, Westford, MA (US); Dah Ming Chiu, Acton, MA (US); Stephen R. Hanna, Bedford, MA (US); Stephen A. Hurst, Nashua, NH (US); Radia J. Perlman, Acton, MA (US); Joseph S. Wesley, Quincy, MA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/473,402

(22) Filed: Dec. 28, 1999

(51) Int. Cl.[7] .............................. H04L 12/28
(52) U.S. Cl. ................... 370/394; 370/394; 709/203
(58) Field of Search ................ 709/203, 204; 370/234, 235, 394, 260

(56) References Cited

U.S. PATENT DOCUMENTS 5,799,318 A * 8/1998 Cardinal et al. ............ 707/104
6,085,225 A * 7/2000 Nakajima et al. ........... 709/203

FOREIGN PATENT DOCUMENTS

WO    WO 00/01123    1/2000

OTHER PUBLICATIONS

Lecture Notes in Computer Science, Dieter Gollman (Ed.), *Computer Security*, Nov., 1994.
Membership Protocols for Distributed Conferece Control, Bala Rajagopalan, *Computer Communications*, vol. 18, No. 10, pp. 695–708, Oct., 1995.
Efficient Security for Large and Dynamic Multicast Groups, Gernano Caronni, Marcel Waldvogel, Dan Sun, Bernhard Plattner, XP–002161662, pp. 376–383, *IEEE* 1998.
Light–weight Reliable Multicast Protocol Specification, Tie Liao, *Internet Draft*, Oct. 13, 1998.

* cited by examiner

Primary Examiner—Douglas Olms
Assistant Examiner—Robert W. Wilson
(74) Attorney, Agent, or Firm—Weingarten, Schurgin, Gagnebin & Lebovici LLP

(57) ABSTRACT

A method and apparatus for identifying a data message that is eligible for discard. A beacon node periodically transmits a beacon message to a plurality of client nodes communicatively coupled via a network. Each beacon message includes a beacon sequence number and preferably, the beacon sequence numbers are authenticated by the beacon, node. The client nodes, upon receipt of the beacon messages, verify the authenticity of the respective received beacon sequence numbers and generate a local sequence number derived from the received beacon sequence number. When one client in the session has data to transmit to another client in the session, the sending client assembles a data message and inserts its local sequence number in the data message prior to transmission of the data message to the other client nodes in the session. The client nodes receiving the data message discard the data message if their respective local sequence number at the time of receipt of the data message exceeds the local sequence number inserted in the data message by a predetermined value. In one embodiment, the beacon node generates sequence numbers at a periodic interval P but only transmits 1 out of every m beacon sequence numbers to the client nodes in the session. The client nodes each set a local sequence counter equal to the beacon sequence number upon receipt of the beacon message and thereafter, increment the local sequence counter periodically at interval P. The local sequence counter value is employed as the local sequence number in each client node.

25 Claims, 7 Drawing Sheets

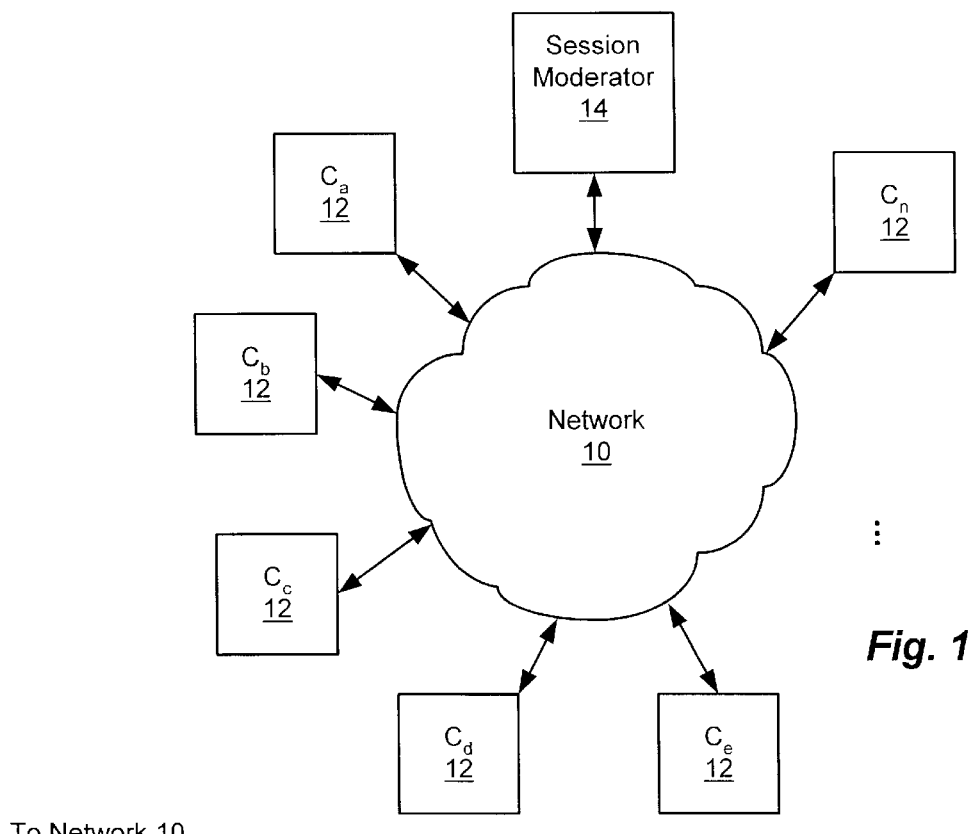
*Fig. 1*
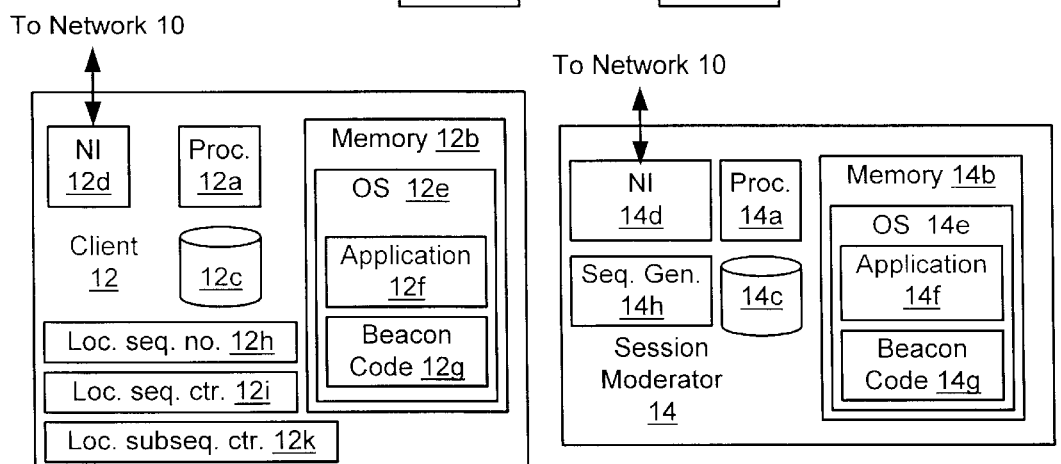
*Fig. 2*
*Fig. 3*

USE OF BEACON MESSAGE IN A NETWORK FOR CLASSIFYING AND DISCARDING MESSAGES

CROSS REFERENCE TO RELATED APPLICATIONS

N/A

STATEMENT REGARDING FEDERALLY SPONSORED RESEARCH OR DEVELOPMENT

N/A

BACKGROUND OF THE INVENTION

The present invention relates to computer networks, and more particularly, to a method and apparatus for identifying at one of a plurality of clients belonging to a session, session messages considered to be duplicate, replayed or stale messages and eligible for discard.

In many network applications, messages may be sent among large groups of clients that are members of a session. For example, in chat groups communicating over the Internet, each client in the session sends messages to all the other clients in the session and each client receives messages transmitted by other clients in real-time. Furthermore, in presence notification applications, a first client logs into a session and a message advising of the first client's presence may be transmitted to a large group of other clients that may be interested in knowing of the first client's presence on the network. When applications such as these send messages among the numerous members of a session, they may use protocols that intentionally send duplicate messages in order to have some level of assurance that most clients in the session have received at least one copy of each message. Duplicate messages may also be sent intentionally in order to update new members. Replayed messages can also be sent in a network by malicious clients that may be attempting to disrupt a session. Finally, messages delayed in transit may be sufficiently old to be of no interest to the receiving client upon their arrival. it may be useful for clients in a session to have a simple way to detect such duplicate, replayed or old messages.

Several techniques have been employed to detect duplicate, replayed or old messages. In one method, users keep track of sequence numbers included in messages transmitted by each client. Keeping track of sequence numbers for every transmitting client, however, is not only compute intensive, but may be difficult if clients join the session at different times. A new client would need to somehow determine the correct sequence number for each existing client in the session. Additionally, some applications do not employ sequence numbers.

It would therefore be useful, when sending messages among the members of a large group, to be able to detect and discard messages which are duplicate, replayed or old messages without keeping track of sequence numbers from each sender.

BRIEF SUMMARY OF THE INVENTION

A method and apparatus for identifying messages as duplicate, replayed or old messages is disclosed. Clients that are members of a session are capable of forwarding messages to other clients in the session over a network and receiving messages sent by other clients in the session over the network in real time. A session moderator is communicatively coupled to the network and is operative to periodically forward a beacon message to the clients in the session via multicast, broadcast or a series of unicast messages. Each beacon message contains a beacon sequence number that is updated at pre-determined intervals in a predetermined sequence. In a preferred embodiment, the beacon message is authenticated so that the members of the session can verify that the beacon message was transmitted by the session moderator. The beacon sequence number is extracted from the beacon message at each client in the session and employed to generate a local sequence number.

A client in the session that wishes to send a message to other members of the session includes the current local sequence number in the message that it transmits. A client in the session that receives the message transmitted by another client in the session compares the local sequence number within the received message to its own current local sequence number. If the current local sequence number generated in the client receiving the message is greater than the local sequence number in the received message by a predetermined value, the received message is considered to be a duplicate, replayed or old message and is eligible for discard. Messages eligible for discard may then be discarded.

In another embodiment of the invention, the session moderator transmits beacon messages to the session members. The beacon messages contain a beacon sequence number which is every nth number in a predetermined number sequence generated within the session moderator, where n is 2 or greater. The received beacon sequence number is stored in the respective clients as a local sequence number which is updated by the respective clients at a pre-determined update interval corresponding to the period for updating the beacon sequence numbers in the session moderator. By sending a beacon message to the clients periodically, the session moderator assures synchronization of the beacon sequence numbers generated in the session moderator with the local sequence numbers maintained by the respective session members.

Other aspects, features, and advantages of the present invention are disclosed in the detailed description that follows.

BRIEF DESCRIPTION OF THE SEVERAL VIEWS OF THE DRAWING

The invention will be more fully understood by reference to the following Detailed Description of the Invention in conjunction with the Drawing of which:

FIG. 1 is a pictorial representation of a system for classifying messages as duplicate messages which is operative in a manner consistent with the present invention;

FIG. 2 is a block diagram depicting the clients of FIG. 1;

FIG. 3 is a block diagram depicting the session moderator of FIG. 1;

DETAILED DESCRIPTION OF THE INVENTION

Figure 4:
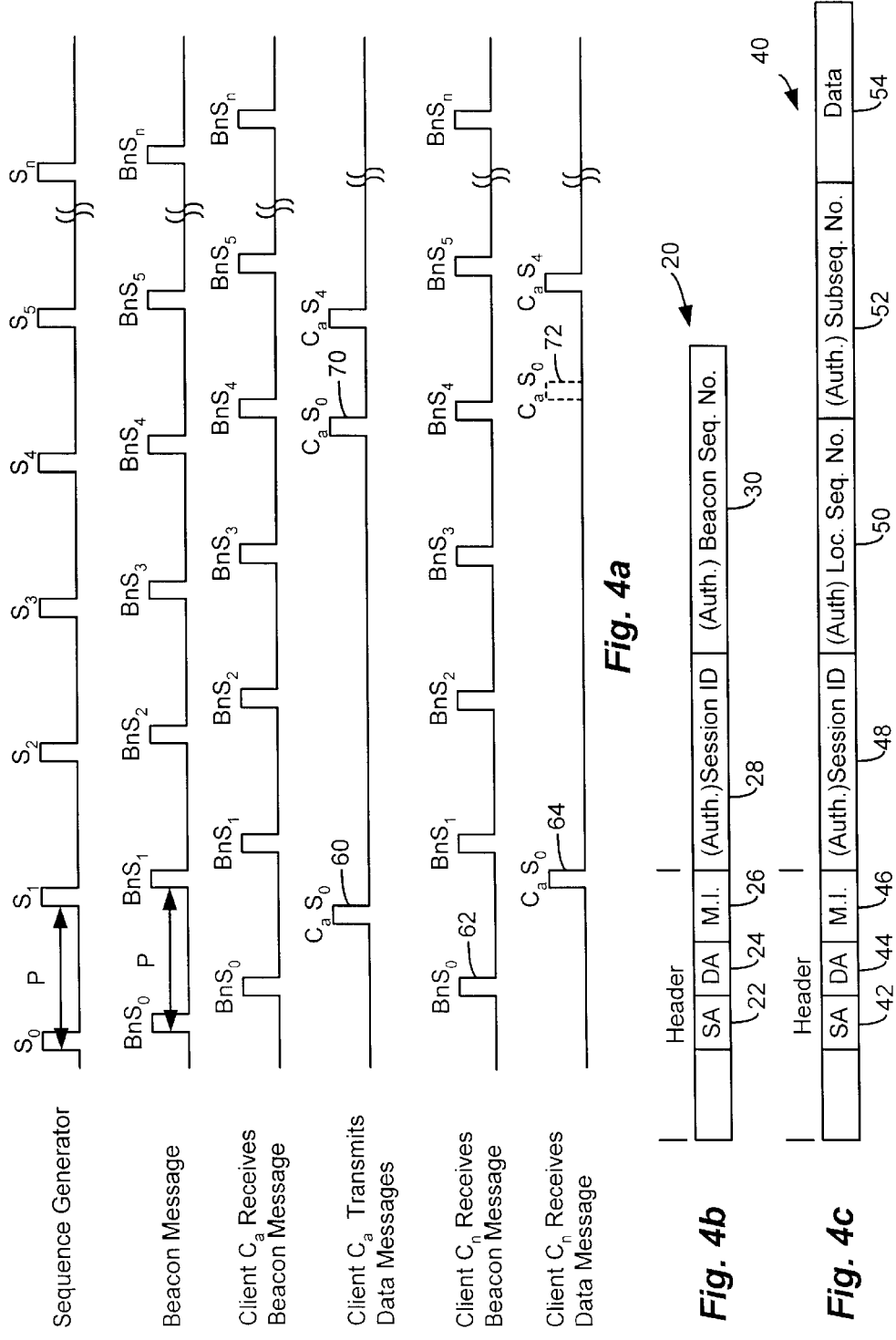
FIG. 4. is a timing diagram illustrating the timing and operation of the system depicted in FIG. 1.

Consistent with the present invention a method and apparatus are disclosed for classifying certain received messages in a communications network as duplicate, replayed or old messages and, in the event of such a classification, identifying the message as eligible for discard. The messages thus classified may then be discarded. The disclosed technique and mechanism reduces the wasteful allocation of limited processing resources to the processing of duplicate, replayed or stale messages.

The operation of one embodiment of the presently disclosed system will be understood by reference to FIGS. 1–8 which are discussed below. Referring to FIG. 1, the system includes a plurality of clients Ca through Cn 12 and a session moderator 14 which are communicably coupled to a network 10. The clients 12 are members of a session in which messages transmitted by one client 12 are forwarded through the network 10 for receipt by the other clients 12 belonging to the session. Exemplary applications include chat groups, presence notification applications and information distribution applications in which information generated by one client 12 is communicated to other clients 12 in a session.

The network 10 may comprise a local area network, a wide area network, the Internet or any other communications network for communicably coupling the respective clients 12 and the session moderator 14.

The clients 12 may each comprise a computer or processor, a personal digital assistant (PDA), a network appliance, a controller, or any other device capable of receiving messages from other clients 12, forwarding messages to the other clients 12, and taking action in response to messages from the session moderator 14 in the manner herein described. An exemplary client 12 is depicted in FIG. 2. As depicted in FIG. 2, the client 12 includes a network interface 12d for communicably coupling the client 12 to the network 10 and a processor 12a operative to execute a software program out of instruction/data memory 12b. The client 12 may optionally include secondary storage 12c. The memory 12b which may comprise RAM, ROM or a combination of both, stores an operating system 12e, application code 12f and beacon code 12g which is discussed in further detail below. The application code 12f includes messaging software for transmitting data messages to other clients 12 in the session and for receiving data messages from other clients 12 in the session. The client 12 also maintains a local sequence number in a storage location 12h and may include a local sequence counter 12i and a local subsequence counter 12k. The local sequence number may be maintained in a hardware register or alternatively, within the memory 12b. The counters 12i and 12k may comprise counters implemented in hardware, or alternatively, counters maintained within the memory 12b which are administered under control of the processor 12a via instruction code executed out of an instruction memory such as the memory 12b.

Referring to FIG. 3, the session moderator 14 includes a network interface 14d for communicably coupling the session moderator 14 to network 10, a processor 14a operative to execute a software program out of the memory 14b. Additionally, the session moderator 14 may include secondary storage 14c. The memory 14b contains an operating system 14e, application code 14f and beacon code 14g which functions in conjunction with the beacon code 12g stored in the respective client 12 memories 12b and operative as subsequently described. The session moderator 14 also includes a sequence generator 14h which is operative to generate a series of beacon sequence numbers in a predetermined sequence order. The sequence generator 14h may be implemented in hardware as an up counter, a down counter, or any other counter operative to provide a series of values in a deterministic sequence. Alternatively, the sequence generator 14h may be implemented as a software counter which is administered by the processor 14a executing instruction code out of an instruction memory such as the memory 14b. The sequence generator may be employed to generate beacon numbers which comprise integer values or alternatively, a time stamp.

The technique employed in a first embodiment of the presently disclosed system for classifying received messages as duplicate, replayed or stale messages, is illustrated in the timing diagram of FIG. 4a. Referring to FIG. 4a, the sequence generator 14h within the session moderator 14 generates a sequence of beacon sequence numbers in the predetermined sequence order, with the interval between successive beacon sequence numbers generally corresponding to an interval "P". As depicted in FIG. 4a, the first beacon sequence number is $S_0$, the second beacon sequence number is $S_1$, etc. As indicated above, the beacon sequence numbers may be generated as successive time stamps or using a wrap-around counter of sufficient size such that a large number of beacon sequence numbers are generated prior to the wrap-around of the counter. In the event a wrap around counter is employed, the size of the wrap-around counter is selected such that a client 12 receiving the beacon message can determine the age of the beacon number contained within the beacon message with respect to beacon numbers contained within previously transmitted beacon messages and data messages so as to be able to use the beacon numbers to detect old, stale or replayed messages as described herein.

The session moderator 14 periodically transmits each successive beacon sequence number $S_0 \ldots S_n$, etc. over the network in a beacon message 20 for receipt by the clients 12 belonging to the session. An exemplary format for the beacon message 20 is shown in FIG. 4b. As illustrated, the beacon message 20 includes a source address 22 which comprises the address of the session moderator 14, a destination address 24, a message identifier 26 that identifies the message as a beacon message 20, a session identifier 28 and a sequence number 30 generated by the session moderator 14. For example, referring to the second line of the timing diagram of FIG. 4a, the session moderator 14 transmits a beacon message 20 $B_nS_0$ which includes the beacon sequence number 30 S0 for receipt by all of the clients 12. Approximately a period P following the transmission of the beacon message 20 BnS0, the session moderator 14 transmits the beacon message 20 BnS1 which includes the beacon sequence number 30 $S_1$, a further period P later the beacon message 20 message BnS2 including the beacon sequence number 30 $S_2$, etc. The destination address 24 may comprise a multicast address for the specific session, a broadcast address, or a unicast address. If the session moderator 14 transmits beacon messages 20 via the use of unicast addresses, consideration must be given to the number of clients 12 in the session, the bandwidth associated with transmission, and network latency to assure that beacon messages 20 are received in a timely manner by the respective clients 12. The session moderator 14 may also transmit unicast beacon messages in response to requests issued by the respective clients 12.

As indicated in the third and fifth line of the timing diagram of FIG. 4a, the beacon messages 20 are received at the clients 12. For purposes of simplicity, the arrival of the beacon messages 20 at just the clients 12 $C_a$ and $C_n$ are shown. It is recognized that the time of receipt of the respective beacon messages 20 at the various clients 12 will depend on a number of factors including the propagation delay along the paths through the network 10, network congestion and switching delays through the network 10.

Preferably, session moderator 14 authenticates the beacon sequence number 30 and the session identifier 28 so that clients 12 within the session can verify that the beacon sequence number 30 and session identifier 28 came from the session moderator 14. In networks in which security is not of concern, the beacon sequence number 30 need not be authenticated. When authentication is employed, any suitable form of authentication may be employed. For example, the beacon sequence number 30 and the session identifier 28 may be authenticated using public key cryptographic techniques. More specifically, the session moderator 14 may be provided with a public key pair comprising a private key and a public key and the relevant portion of the beacon message 20 (including the session identifier 28 and the sequence number 30) are digitally signed using the private key of the session moderator 14. The session identifier 28 and the sequence number 30 within the beacon message 20 may then be verified by the receiving clients 12 using the public key of the session moderator 14. Moreover, authentication may be performed using a keyed hash, any suitable cryptographic hash incorporated in an encrypted message or any other known authentication technique.

Upon receipt of the beacon message 20, the respective client 12 extracts the beacon sequence number 30 contained in the beacon message 20 and stores the received beacon sequence number 30 as a local sequence number 50 in the register 12h. When a client 12 has data to send to the other clients 12 in the session, the sending client 12 assembles a data message 40. An exemplary format for such a data message 40 is depicted in FIG. 4c. The data message 40 includes a source address 42, a destination address 44 which may comprises a multicast address for the session, a broadcast address or a unicast address, a message identifier 46 that identifies the message as a data message 40, a session identifier 48, a local sequence number 50 obtained from the sending client 12 at the time of message transmission, an optional subsequence number 52 and data 54. The purpose of the subsequence number 52 is discussed later.

Receipt of a beacon message 20 and transmission of a data message 40 by client 12 $C_a$ are depicted in lines 3 and 4 of FIG. 4a. By way of example the client 12 $C_a$ receives the beacon message 20 $B_nS_0$, extracts the sequence number 30 from the beacon message 20 and stores the extracted sequence number 30 as a local sequence number 50. The local sequence number 50 may be stored as an authenticated value or alternatively, as the extracted local sequence number. When client 12 $C_a$ has a data message 40 to send, such as the data message 40 transmitted during the period specified at 60 in line 4, the client 12 assembles a data message. The client 12 inserts the local sequence number 50 stored in local sequence number register 12h (which corresponds to the last received beacon sequence number 30) and transmits the data message 40 over the network 10 for receipt by the other clients 12 in the session. Accordingly, referring to the message transmitted at 60, the last received beacon message 20 contained the beacon sequence number 30 $S_0$, so the data message transmitted by client 12 $C_a$ at 60 includes the local sequence number 50 S0.

The data message 40 transmitted by client 12 $C_a$ is received by the other clients 12 in the session including client 12 $C_n$ as depicted in line 6 of FIG. 4a. More specifically, client 12 $C_n$ receives the data message 40 transmitted by client 12 $C_a$ at time 64. Client 12 $C_n$, like the other clients 12 in the session, is receiving beacon messages 20 from the session moderator 14 on a generally periodic basis. As shown, at time 62, the client 12 $C_n$, has received the beacon message 20 $B_nS_0$ from the session moderator 14. Thus, as of the time of receipt of the data message 40 from client 12 $C_a$ at time 64, client 12 $C_n$ has a stored local sequence number 50 of So corresponding to the sequence number 30 of the last received beacon message 20.

To determine whether a data message 40 received at a receiving client 12 is eligible for discard, the receiving client 12 (e.g. $C_n$ in this example) subtracts the local sequence number 50 contained in the received data message 40 from the local sequence number 50 corresponding to the sequence number 30 in the last received beacon message 20 stored in the receiving client 12 (i.e. $S_0$ in the present example) to obtain a difference value. If the difference value is greater than a predetermined value, the received data message 40 is considered to be a duplicate, replayed or old message and is considered eligible for discard. The client 12 that received the respective data message 40 may then discard the data message.

By way of example, assume that each successive beacon sequence number 30 is incremented by one and that a data message 40 is considered to be a duplicate, replayed or old if the difference value is 3 or greater. In such event, since the local sequence number 50 in client 12 $C_n$ in the present example equals $S_0$ and the received local sequence number 50 in the data message 40 from the client 12 $C_n$ equals $S_0$, the data message 40 is not eligible for discard since the difference value is not 3 or greater.

Assume however, that client 12 $C_a$ generates a data message 40 at time 70 which is a duplicate of the data message 40 previously transmitted at time 60 (as depicted in line 4 of FIG. 4a). The data message 40 transmitted at time 70 is received at client 12 Cnat time 72 when the local sequence number 50 in client 12 $C_n$ corresponds to S4. Client 12 $C_n$ generates a difference value (S4–S0) of four (4) and discards the data message 40 received from client $C_a$ upon determining that the difference value is 3 or greater. In the foregoing manner the clients 12 in a session reduce processing associated with data messages 40 which are considered to be duplicate, replayed or old data messages 40.

The difference value threshold for discarding messages for a particular session will depend upon the anticipated latency variations within the network 10, the beacon message 20 periodicity interval P, and the application characteristics. For instance, if clients 12 in a session send at most one data message 40 per beacon message interval, on a reliable network with very short transmission delays, the difference value threshold may be a number such as 2–5. On the other hand, in an unreliable network having long and varying delays, the difference value threshold may be set to a higher value to allow for greater differences between the local sequence number 50 derived from the beacon message 20 sequence number 30 in a receiving client and the local sequence number 50 received in the respective data message 40 at the respective client 12.

Figure 5:
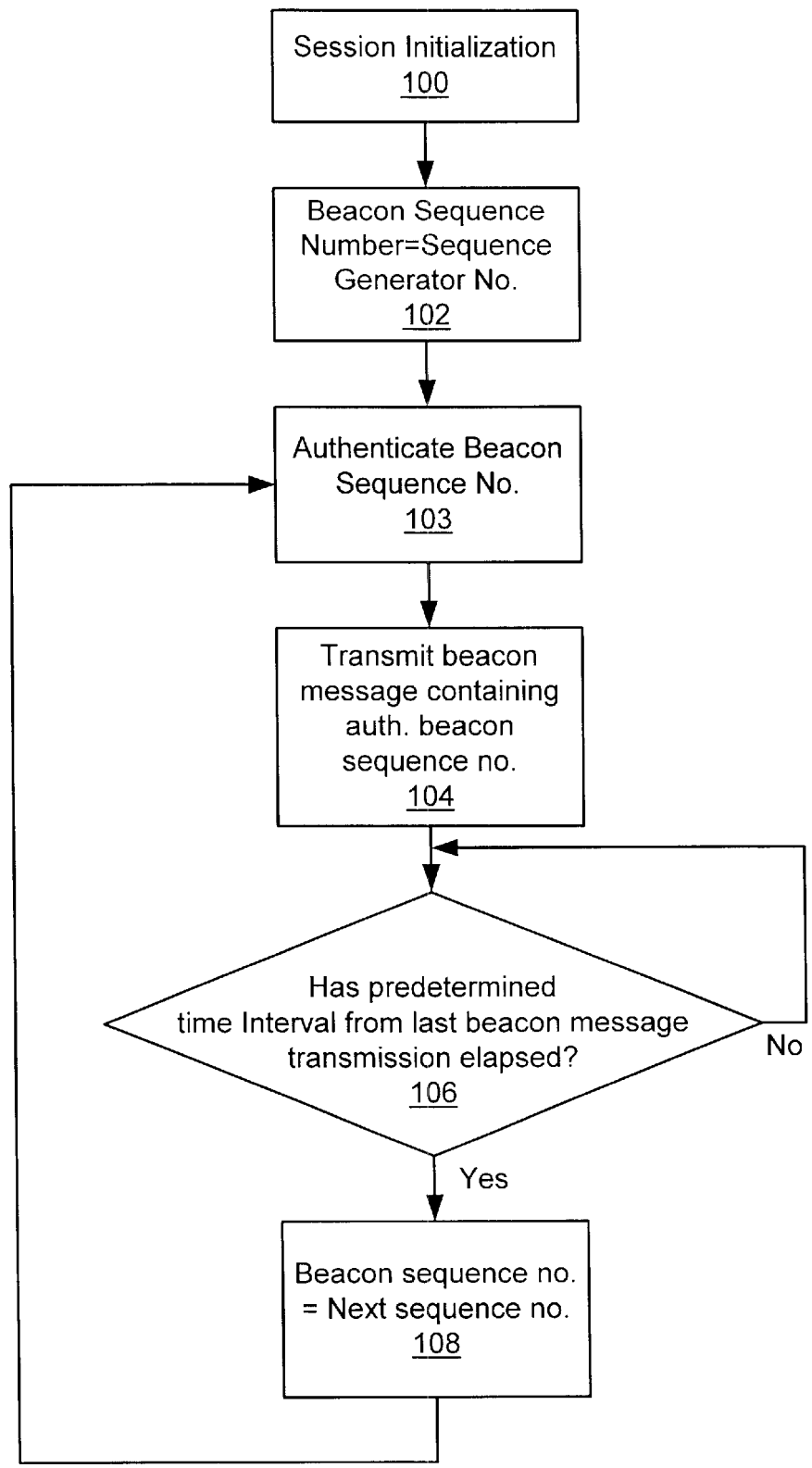
FIG. 5 is a flow diagram illustrating a process for beacon message generation and transmission employed in the system of FIG. 1.

The operation of the session moderator 14 is illustrated in the flow chart of FIG. 5. Referring to FIG. 5, a session is initialized as illustrated in step 100. Session initialization may include the assignment of a multicast address to be employed in conjunction with the session for beacon message 20 transmission, the establishment of a unique session identifier to allow clients 12 within the session to identify session related messages and initialization of the sequence generator 14h within the session moderator 14. The beacon sequence numbers correspond to the current value of the sequence generator 14h as shown in step 102. As depicted in step 103, the beacon sequence number 30 is authenticated if authentication is employed. The beacon sequence number 30 or the authenticated beacon sequence number 30, as applicable, is then transmitted over the network 10 to the clients 12 within the session as shown in step 104.

As depicted in inquiry step 106, a determination is next made whether a predetermined period has elapsed since the transmission of the last beacon message 20 by the session moderator 14. In the event that the predetermined period P has not elapsed, the session moderator 14 delays until such time has elapsed. When the predetermined period P has elapsed since the transmission of the last beacon message 20, the session moderator 14 obtains the next sequence number 30 as indicated in step 108, authenticates the sequence number, if applicable, and passes control once again to step 104. In this manner, the session moderator 14 transmits beacon messages 20 periodically containing sequence numbers 30 for receipt by the respective clients 12 in the session.

Figure 6:
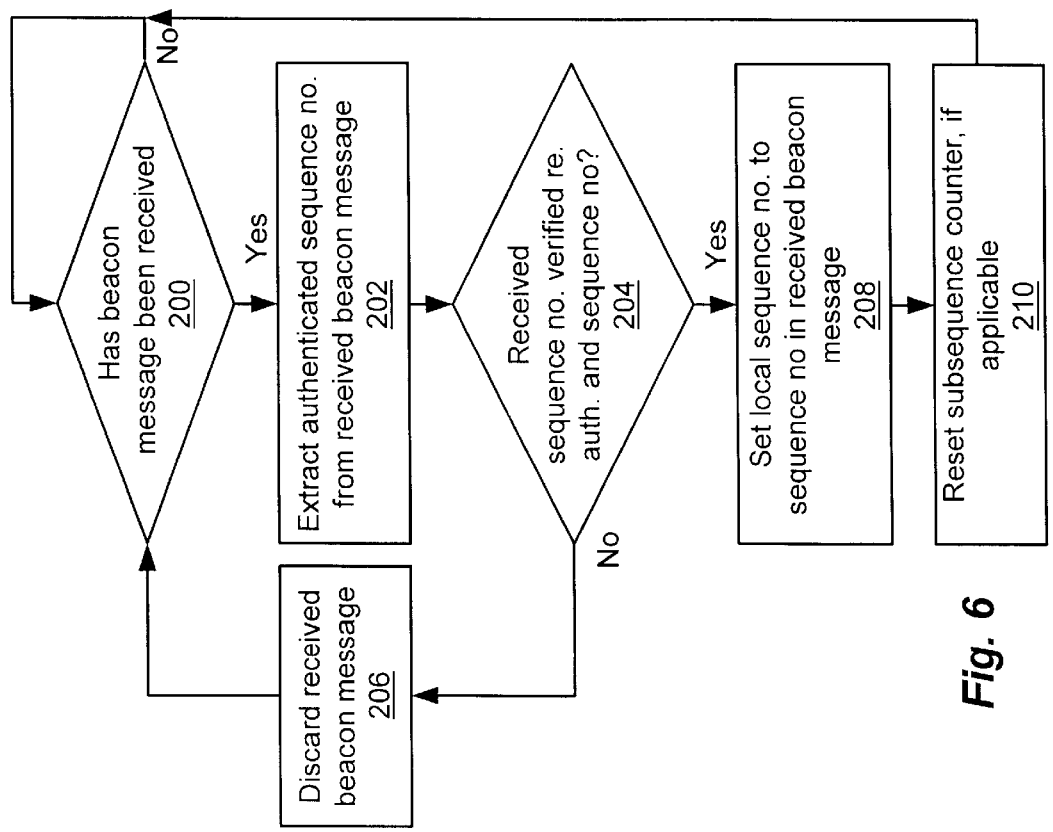
FIG. 6 is a flow diagram illustrating processing at a client upon receipt of a beacon message.

The operation of a client 12 in response to receipt of a beacon message 20 is illustrated in FIG. 6. Referring to FIG. 6, a determination is made at the respective client 12 whether a beacon message 20 has been received as shown at decision step 200. In the event no beacon message 20 has been received, beacon message processing is deferred until a beacon message 20 is received. In the event a beacon message 20 is received, the beacon sequence number 30 is extracted from the beacon message 20 as shown in step 202 and the sequence number 30 is verified as illustrated in step 204. The verification may include, in addition to verification of the authenticity of the sequence number 30 (if authentication is employed), a verification that the received sequence number is greater (or further along in the predetermined sequence) than previously received beacon sequence numbers 30. If the received beacon sequence number is not verified, the received beacon message 20 is discarded as illustrated in step 206 and the client 12 awaits the receipt of another beacon message 20. In the event it is determined in the verification step 204 that the received beacon sequence number 30 is authentic (assuming authentication is employed) and the received beacon sequence number 30 is greater (or further along in the predetermined sequence) than previously received valid beacon sequence numbers 30, as indicated in step 208, the respective client 12 sets the local sequence number 50 to the beacon sequence number 30 extracted from the last received beacon message 20. As shown in step 210, if subsequence numbering is employed, as discussed with more particularity with respect to FIG. 7, the subsequence counter is reset. Control then passes to step 200 to await receipt of the next beacon message 20.

Figure 7:
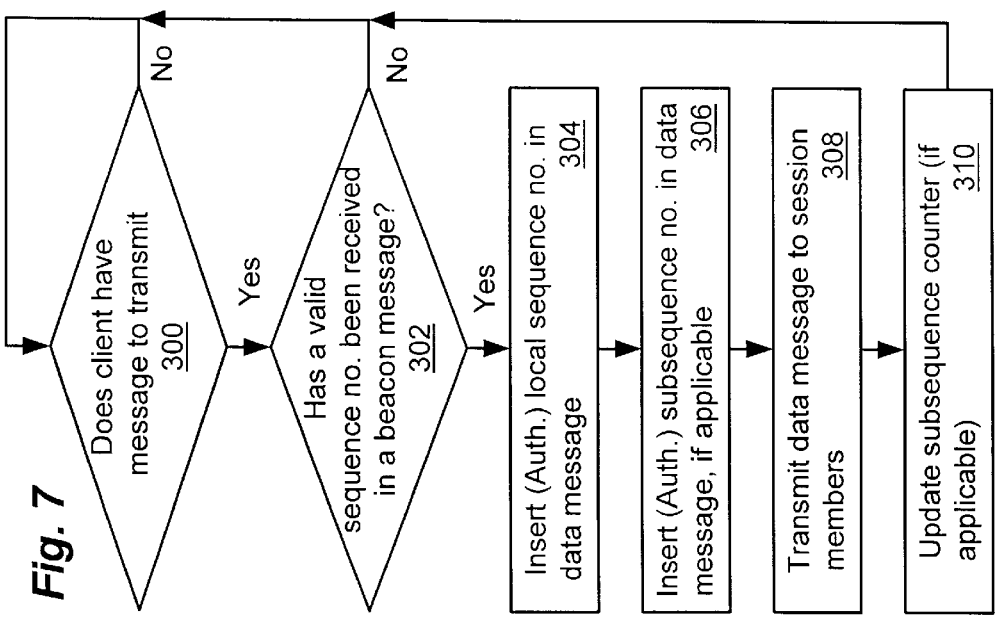
FIG. 7 is a flow diagram illustrating a process for transmitting sequence numbers among clients in the system of FIG. 1.

The operation of a client 12 having a message to transmit to other members of the session is illustrated in the flow diagram of FIG. 7. Referring to FIG. 7, a determination is made whether a client 12 has a data message 40 to transmit as depicted in decision step 300. In the event that the client 12 has a data message 40 to transmit, a determination is made, as depicted in decision step 302, whether a beacon message 20 having a valid beacon sequence number 30 has been received for the respective session. In the event a beacon message 20 containing a valid beacon sequence number 30 has not been received, control passes to decision step 300 and the client 12 awaits receipt of a beacon message 20 containing a valid beacon sequence number 30. In the event it is determined in decision step 302 that a beacon message 20 containing a valid beacon sequence number 30 has been received, the client 12 obtains the local sequence number 50 corresponding to the last valid beacon sequence number 30 included in a beacon message 20 and inserts the local sequence number 50 in the data message 40 to be transmitted as illustrated in step 304. The clients 12 may transmit authenticated local sequence numbers 50 within the data messages 40 to prevent malicious clients 12 from transmitting erroneous local sequence numbers 50 in session messages in an effort to disrupt the session. Additionally, the client 12 may obtain a subsequence number 52 from the subsequence number counter 12k maintained in the respective client 12 and insert the subsequence number 52 in the data message 40 to be transmitted as depicted in step 306. The subsequence number 52 identifies the number of data messages 40 transmitted since the last received beacon message 20 containing a valid beacon sequence number 30 and may be employed by the receiving clients 12 for message ordering in the event that a client 12 transmits multiple data messages 40 between receipt of successive beacon messages 20. For example, the first data message 40 transmitted by a client 12 since the last received valid beacon message 20 includes a subsequence number 52 of 0, the second data message 40 transmitted by a client 12 after receipt of the last received beacon message 20 has a subsequence number 52 of 1, etc. The assembled data message 40 is transmitted to other clients belonging to the session as illustrated in step 308. As indicated in step 310, the subsequence counter 12k is updated (incremented for an up counter) upon transmission of a data message 40 from the respective client 12. Following updating of the subsequence counter 12k, if applicable, control passes to step 300 to await receipt of an indication that the respective client 12 has another data message 40 to transmit. The subsequence counter 12k is reset upon receipt of a beacon message 20 containing a valid beacon sequence number 30 (See FIG. 6, step 210).

Figure 8:
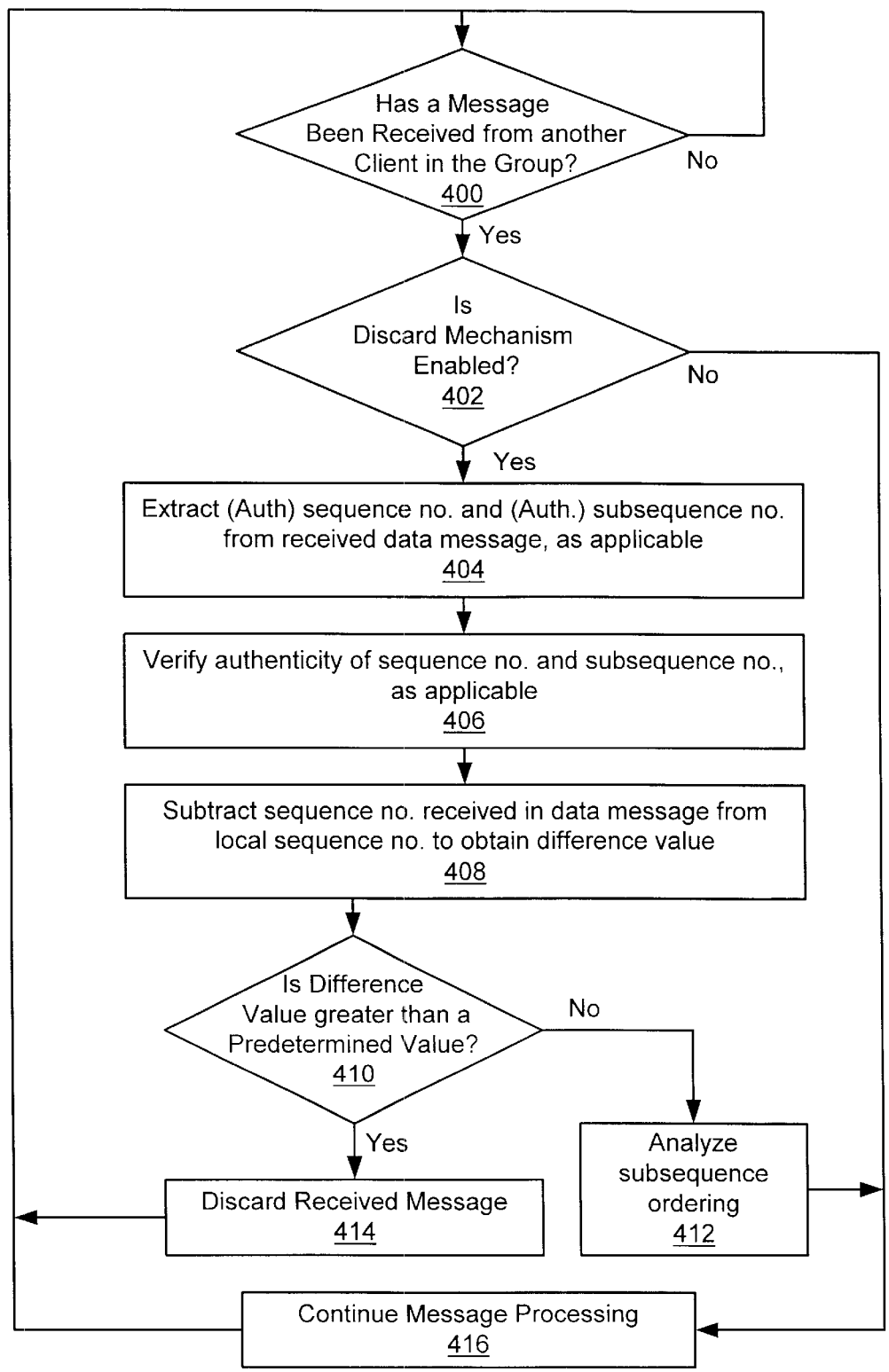
FIG. 8 is a flow diagram depicting a process for message reception at a client within the system depicted in FIG. 1.

The operation of a client 12 upon receipt of a data message 40 from another client 12 in the session is illustrated in the flow diagram of FIG. 8. Referring to FIG. 8, as indicated in decision step 400, a determination is made whether a data message 40 has been received from another client 12 in the session. In the event it is determined that a data message 40 has been received at the respective client 12, control passes to decision step 402. As illustrated in decision step 402, a determination is made whether the presently described discard mechanism is enabled. If the discard mechanism is disabled, control passes to step 416 and processing of the received data message 40 continues. The discard mechanism will be disabled in circumstances in which a client 12 has recently joined a session and has requested that previously sent messages be re-forwarded. Additionally, in the event a client 12 does not receive a message in a sequence of messages, it may request that a duplicate be forwarded. If the discard mechanism is not disabled in such circumstances, the duplicate data message 40 might otherwise be discarded.

In the event the discard mechanism is enabled, following receipt of a data message 40, as illustrated in step 404, the local sequence number 50 transmitted in the respective data message 40 and the subsequence number 52 (if present) are extracted from the data message 40. The extracted local sequence number 50 and the subsequence number 52 are then verified if the transmitting client 12 authenticated such fields as shown in step 406. A difference value is then obtained, as illustrated in step 408, by subtracting the local sequence number 50 extracted from the received data message 40 from the local sequence number 50 for the respective client 12 (corresponding to the sequence number 30 in the last received beacon message 20). A determination is then made whether the difference value exceeds a predetermined threshold value as depicted in step 410. If the difference value exceeds the predetermined threshold value, the received data message 40 is discarded as indicated in step 414. If the difference value does not exceed the predetermined threshold value for the session, subsequence numbers 52 are analyzed for ordering of received data messages 40 (if subsequence ordering is employed), control passes to step 416 and message processing continues. Following message discard (step 414) or message processing (step 416), control passes to step 400 and the client 12 awaits receipt of a further data message 40 from a client 12 within the session.

In a variation of the above-described embodiment, the session moderator 14 may transmit multiple beacon messages 20 which include the same beacon sequence number 30 within the period P described above. The repeated transmission by the session moderator 14 of beacon messages 20 which include the same beacon sequence number 30 may be advantageous in an unreliable network 10 if beacon messages 20 are routinely not received at clients 12 belonging to the session. In the event multiple beacon messages 20 are transmitted by the session moderator 14 having the same beacon sequence number 30, the method of operation depicted in FIG. 6 is modified to include an inquiry after step 204 to determine if the received beacon message 20 contains a beacon sequence number which is a duplicate of a previously received beacon sequence number 30. In the event the received beacon message 20 contains a beacon sequence number 30 which is a duplicate of a beacon sequence number 30 from a previously received beacon message 20, the beacon message 20 is discarded. Otherwise control passes to step 206.

Figure 9:
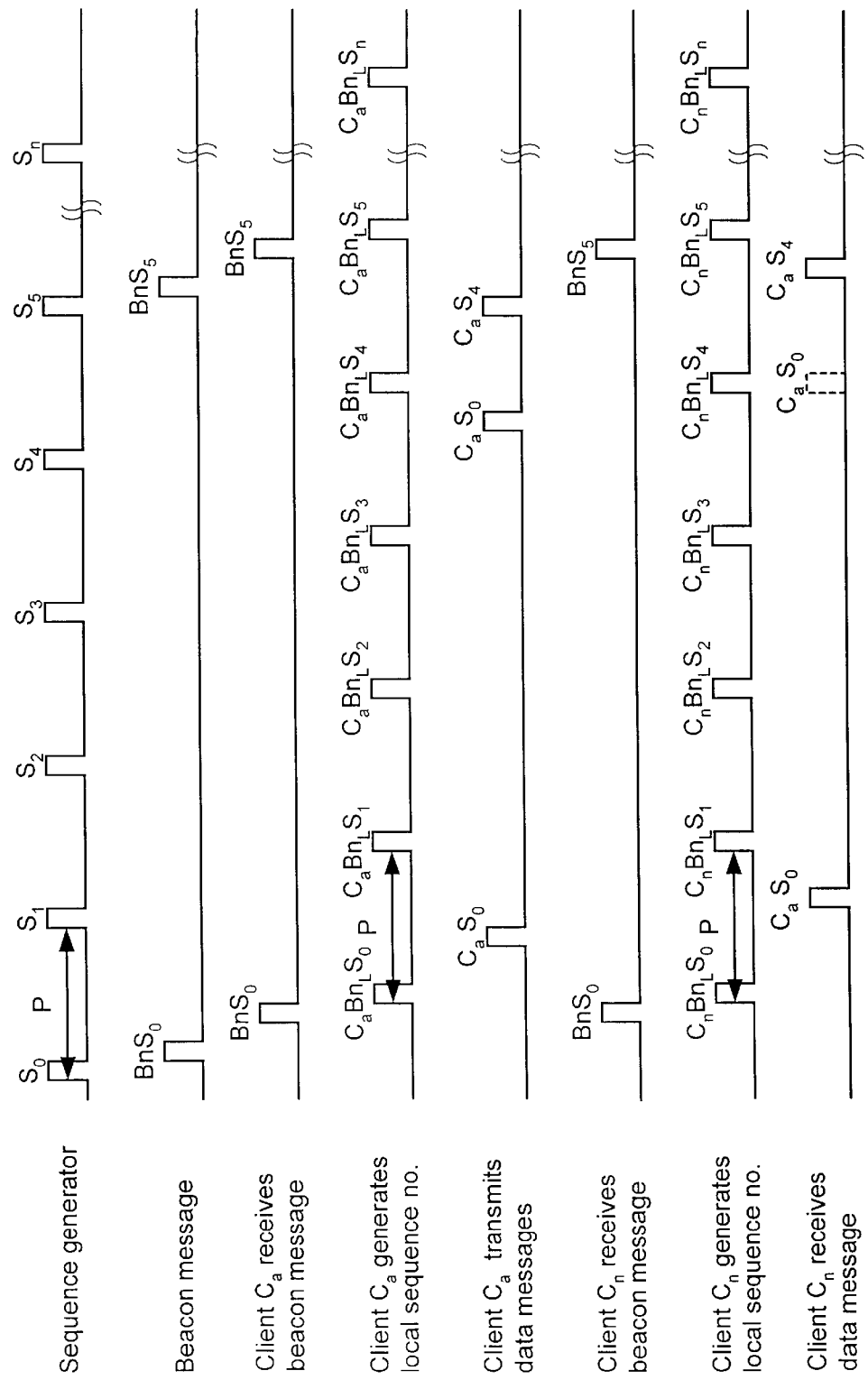
FIG. 9 is a timing diagram depicting an alternative technique for transmitting beacon sequence numbers and generating local sequence numbers at clients in the system depicted in FIG. 1.

Another embodiment of the presently disclosed system is illustrated in the timing diagram of FIG. 9. Referring to FIG. 9, the session moderator 14 includes a sequence generator 14h which generates a series of beacon sequence numbers 30 having a predetermined sequence order. Each successive beacon sequence number 30 in the predetermined sequence is generated at approximately an interval P following the generation of the prior beacon sequence number 30. The beacon message 20 in this embodiment, however, does not transmit every beacon sequence number 30 in the sequence. Instead, the session moderator 14 only transmits one out of every m beacon sequence numbers 30 in the sequence, where m is two (2) or greater. In the example depicted in FIG. 9, the session moderator 14 transmits every fifth beacon sequence number 30; i.e. $S_0$, $S_5$, $S_{10}$, . . . Upon receipt of the beacon message 20, the respective clients 12 store the beacon sequence number 30 extracted from the beacon message 20 in a local sequence counter 12i which is then incremented with the same periodicity P as the sequence generator 14h in the session moderator 14. Thus, the local sequence counter 12i in each of the clients 12 mirrors the sequence generator 14h in the session moderator 14 although the respective local sequence counters 12i may lag the sequence generator 14h due to network latency. When a client 12 has a data message 40 to send to the other clients 12 in the session, the transmitting client 12 uses the value of the local sequence counter 12i as the local sequence number 50 and inserts the local sequence number 50 in the data message 40 in the manner described hereinabove. By employing a local sequence counter 12i, system operation is not as readily affected by the failure of a client 12 to receive one or more beacon messages 20. When beacon messages 20 are received, they serve to resynchronize the respective client 12 to the beacon sequence number 30 generated by the sequence generator 14h of the session moderator 14. Additionally, the use of the local sequence counter 12i decreases the number of beacon messages 20 that need to be transmitted over the network 10 and thus conserves network 10 bandwidth.

Figure 10:
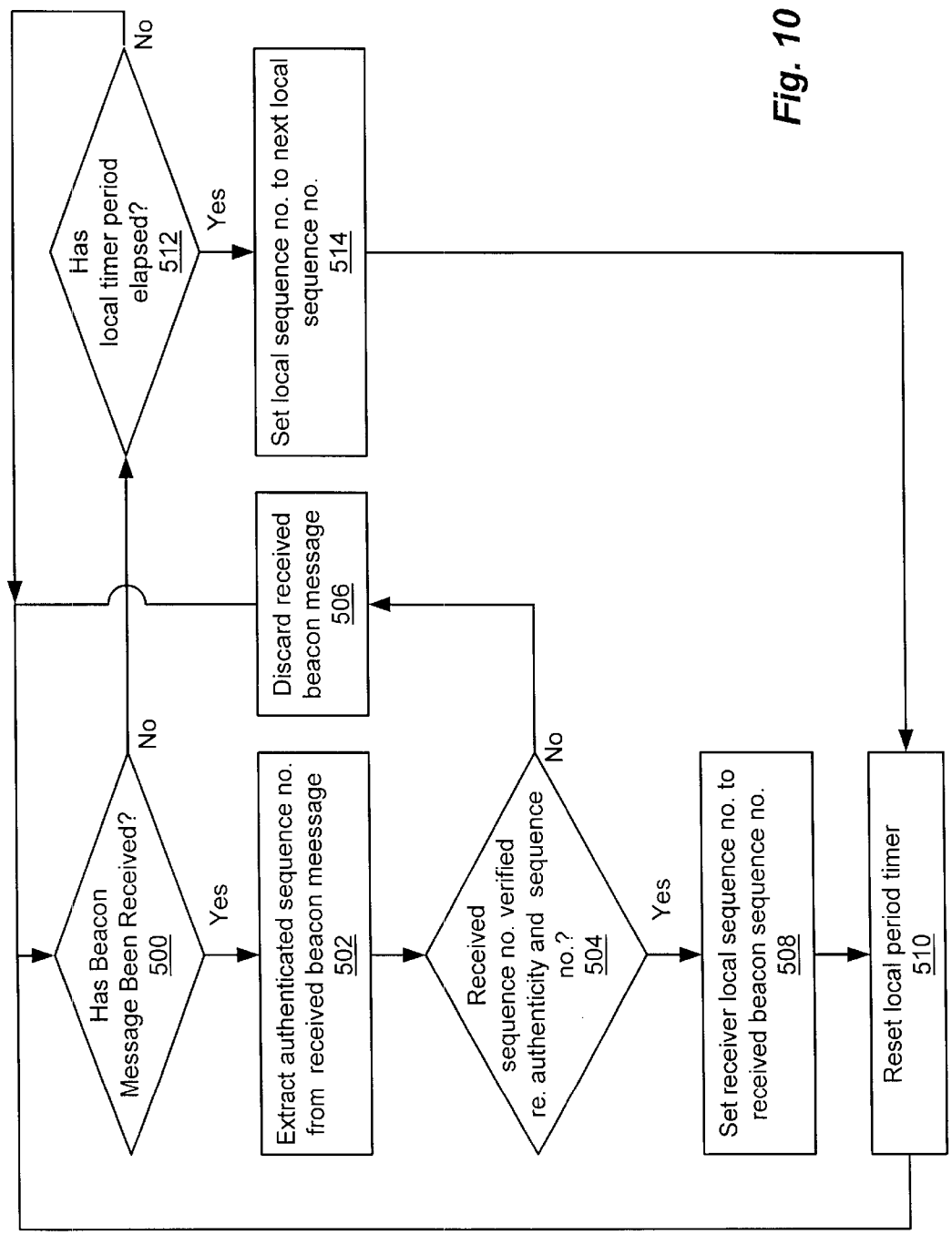
FIG. 10 is a flow diagram depicting an alternative method for generating local sequence numbers in the system of FIG. 1.

The operation of a client 12 upon receipt of a beacon message 20 in the embodiment illustrated by the timing diagram of FIG. 9, is shown in the flow diagram of FIG. 10. Referring to FIG. 10, the client 12 awaits receipt of a beacon message 20 as indicated in decision step 500. Upon receipt of a beacon message 20, the client 12 extracts the beacon sequence number 30 from the received beacon message 20 as illustrated in step 502. The client 12 next verifies the received beacon sequence number 30 to assure that it is came from the session moderator 14 (if authentication is employed) and that it is a beacon sequence number that is greater than a previously received valid beacon sequence number 30 (or a beacon sequence number 30 subsequent to a previously received sequence number in the predetermined number sequence) as depicted in step 504. If the received beacon sequence number 30 is not verified or is not greater than (or a beacon sequence number 30 subsequent to) a previously received valid beacon sequence number 30, the received beacon message 20 and beacon sequence number 30 are discarded as shown in step 506 and the client 12 awaits receipt of a further beacon message 20 as depicted in step 500. If the client 12 determines that the received beacon sequence number 30 is authentic and is greater than a previously received valid beacon sequence number (or an appropriate subsequent beacon sequence number in the predetermined sequence), then the client 12 local sequence number 50 is set equal to the received beacon sequence number 30 from the received beacon message 20 as shown in step 508. The local period timer is reset as depicted in step 510 to time the next period P and control passes to step 500.

Inquiry is made in step 500 if a beacon message 20 has been received. If no beacon message 20 has been received control passes to inquiry step 512. As indicated in inquiry step 512, an inquiry is made whether the local timer period P has elapsed. The local timer period corresponds generally to the period P established for the sequence generator 14h in the session moderator 14. If the local timer period P has not elapsed, control returns to step 500. If the local timer period P has elapsed, the local sequence counter 12i is incremented (or set to the next local sequence number 50) as depicted in step 514. Control then passes to step 510, wherein the local period timer is reset, and inquiry is again made in step 500 whether a beacon message 20 has been received.

In the foregoing manner, the clients 12 can maintain a local sequence number 50 which is synchronized to the beacon sequence number 30 generated by the sequence generator 14h in the session moderator 14 even if some beacon messages 20 are not received.

While the session moderator 14 and the clients 12 are illustrated as separate nodes coupled to the network 10, the session moderator 14 and one of the clients 12 may comprise a common node sharing hardware resources. In such event, the beacon sequence number 30 may be passed to the associated client 12 within the common node or transmitted over the network 10 for receipt by the respective client.

Those skilled in the art should readily appreciate that software programs operative to perform the functions herein described may be executed by the processors 12a and 14a out of memories 12b and 14b respectively. Furthermore, those skilled in the art will appreciate that such programs can be delivered to the clients 12 and the session moderator 14 in many forms, including but not limited to: (a) information permanently stored in a non-writable storage media (e.g. read-only memory devices within a computer such as ROM or CD-ROM disks readable by a computer I/O attachment; (b) information alterably stored on writable storage media (e.g. floppy disks, tapes, read/write optical media and hard drives); or (c) information conveyed to the clients 12 and the session moderator 14 through a communication media, for example, using baseband or broadband signaling techniques, such as over computer or telephone networks via a modem. In addition, while in the presently disclosed embodiments, the functions are illustrated in the form of software methods executing out of a memory on respective client 12 and session moderator 14 processors 12a and 14a respectively, the presently described functions may alternatively be embodied in part or in whole using hardware components such as Application Specific Integrated Circuits (ASICs), state machines, controllers or other hardware components or devices, or a combination of hardware components and software processes without departing from the inventive concepts herein described.

Finally, those of ordinary skill in the art will appreciate that variations to and modifications of the above-described methods and apparatus for classifying received messages at a client 12 utilizing a beacon sequence number transmitted to the client 12 from a session moderator 14 may be made without departing from the inventive concepts disclosed herein. Accordingly, the invention should be viewed as limited solely by the scope and spirit of the appended claims.

What is claimed is:

1. A method for identifying a data message received over a network for discard, said method comprising the steps of:
    receiving at least at a first node and a second node, at least one beacon message from a beacon node, said at least one beacon message containing a beacon sequence number comprising one number in a predetermined number sequence;
    generating at said first node and said second node, a local sequence number based upon the beacon sequence number contained in the at least one beacon message;
    forwarding over said network from said second node to said first node a data message including said local sequence number of said second node; and
    identifying said data message as eligible for discard at said first node if said first node local sequence number exceeds said sequence number included in said data message by a predetermined value.

2. The method of claim 1 further comprising the step of discarding said data message in the event said data message is identified at said first node as being eligible for discard.

3. The method of claim 1 wherein said beacon message receiving step further comprises:
    verifying that said beacon sequence number has been received from said beacon node in an unmodified state; and
    discarding said at least one beacon message in the event that said beacon sequence number is determined to have not been received from said beacon node in an unmodified state.

4. The method of claim 3 wherein said beacon sequence number comprises a sequence number digitally signed by said beacon node.

5. The method of claim 1 wherein said step of receiving said at least one beacon message comprises the step of receiving over said network at said first and second nodes a plurality of beacon messages.

6. The method of claim 5 wherein said step of receiving said plurality of beacon messages at said first and second nodes comprises the step of receiving respective ones of said plurality of beacon messages at said nodes substantially periodically.

7. The method of claim 1 wherein said step of generating a local sequence number based upon said at least one received beacon sequence number comprises the step of setting said local sequence number equal to each received beacon sequence number upon receipt of the respective beacon message.

8. The method of claim 1 wherein said predetermined number sequence is a sequence of sequential integers.

9. The method of claim 8 wherein each successive beacon sequence number equals the next successive integer in said sequence of sequential integers.

10. The method of claim 1 wherein said beacon message receiving step comprises the step of receiving a plurality of beacon messages over said network, each of said beacon messages including one sequence number of a subset of sequence numbers in said predetermined number sequence, and
    said generating step comprises the step of generating a plurality of local sequence numbers at said first node and said second node which include additional sequence numbers in said predetermined number sequence not found in said received beacon sequence numbers.

11. The method of claim 1 wherein said beacon message receiving step comprises the step of receiving a plurality of beacon messages over said network, wherein said beacon messages are received substantially periodically and each beacon message includes a beacon sequence number which corresponds to one of every nth number in said predetermined number sequence, where n is at least 2, and
    said generating step comprises the step of generating a plurality of local sequence numbers at said first node which include additional sequence numbers in said predetermined number sequence not found in said received beacon sequence numbers.

12. The method of claim 1 wherein beacon message receiving step comprises the step of receiving a plurality of beacon messages,
    said data message receiving step further includes the steps of receiving at said first node a plurality of data messages from said second node between receipt of a successive pair of said plurality of beacon messages, reading a subsequence number contained within respective ones of said plurality of data messages, said subsequence number indicative of the order of transmission of the respective data messages, and ordering said received data messages based upon the subsequence numbers contained within the respective received data messages.

13. The method of claim 12 wherein said subsequence numbers comprise authenticated subsequence numbers and said data message forwarding step includes the step of verifying the authenticity of said subsequence numbers.

14. The method of claim 1 wherein said local sequence number of said second node included within said data message comprises an authenticated sequence number and said data message forwarding step includes the step of verifying the authenticity of said local sequence number included in said data message at said first node.

15. A method for identifying a data message that is eligible for discard, said method comprising the steps of:
   transmitting a plurality of beacon messages from a beacon node to at least first and second nodes comprising members of a session, each of said beacon messages including a beacon sequence number comprising a number in a predetermined number sequence;
   in response to the receipt of each one of said plurality said beacon sequence numbers at said first and second nodes, generating at least one local sequence number;
   inserting in a data message at said second node, one of said plurality of local sequence numbers, derived, at least in part, from the last beacon sequence number received from said beacon node at said second node;
   transmitting said data message from said second node to said first node;
   receiving said data message at said first node at a data message receipt time; and
   identifying said data message as eligible for discard in the event said first node local sequence number as of said data message receipt time exceeds by a predetermined value, said local sequence number inserted in said data message.

16. The method of claim 15 wherein said method further includes the step of discarding said data message in the event said data message is identified as eligible for discard.

17. The method of claim 15 wherein said beacon sequence number comprises a beacon sequence number authenticated by said beacon node and said method further includes the step of verifying the authenticity of said authenticated beacon sequence number at said first and second nodes.

18. The method of claim 15 wherein said beacon message receiving step comprises the step of receiving a plurality of beacon messages wherein each one of said beacon messages includes a beacon sequence number which is one number in said predetermined number sequence.

19. The method of claim 18 wherein each successive the beacon sequence number in each successive beacon message comprises the next number is said predetermined number sequence.

20. The method of claim 18 wherein each beacon sequence number corresponds to one number in said predetermined number sequence, and the respective beacon sequence number in each successive beacon message comprises the nth sequence number in said predetermined number sequence following the last beacon sequence number, where n is at least two.

21. The method of claim 20 wherein said local sequence number generating step comprises the step of generating a sequence of local sequence numbers at said first and second nodes which correspond to each of said numbers in said predetermined number sequence in response to receipt of said beacon messages.

22. Apparatus for identifying a data message that is eligible for discard, said apparatus comprising of:
   first and second nodes communicatively coupled by a network;
   a beacon node communicatively coupled to said first and second nodes over said network and operative to transmit a plurality of beacon messages to at least said first and second nodes, each of said beacon messages including a beacon sequence number comprising a number in a predetermined sequence of numbers;
   said first and second nodes operative in response to the receipt of each one of said plurality of said beacon sequence numbers, to generate at least one local sequence number;
   said second node operative to insert in a data message, one of said plurality of second node local sequence numbers, wherein said inserted second node local sequence number is generated from the last received beacon sequence number and corresponds to one of said numbers in said predetermined number sequence;
   said second node further operative to transmit said data message to said first node;
   said first node operative to receive said data message at a data message receipt time and to identify said data message as eligible for discard in the event said first node local sequence number as of said data message receipt time exceeds, by a predetermined value, said local sequence number inserted in said data message.

23. A computer program product including a computer readable medium, said computer readable medium having a computer program stored thereon for execution in a computer and comprising:
   program code for receiving at least at a first node and a second node over said network, at least one beacon message transmitted from a beacon node, said at least one beacon message containing a beacon sequence number;
   program code for generating at said first node, a local sequence number based upon the beacon sequence number in the at least one beacon messages received at said first node;
   program code for receiving at said first node a data message from said second node, said data message including a receive sequence number, said receive sequence number derived from one of said at least one beacon messages transmitted by said beacon node and stored in said data message by said second node; and
   program code for identifying said data message as eligible for discard if said first node local sequence number exceeds said receive sequence number by a predetermined value.

24. A computer data signal, said computer data signal including a computer program for use in determining whether a received data message is eligible for discard, said computer program comprising:
   program code for receiving at least at a first node and a second node over said network, at least one beacon message transmitted from a beacon node, said at least one beacon message containing a beacon sequence number;
   program code for generating at said first node, a local sequence number based upon the beacon sequence number in the at least one beacon messages received at said first node;
   program code for receiving at said first node a data message from said second node, said data message including a receive sequence number, said receive sequence number derived from one of said at least one beacon messages transmitted by said beacon node and stored in said data message by said second node; and program code for identifying said data message as eligible for discard if said first node local sequence number exceeds said receive sequence number by a predetermined value.

25. Apparatus for identifying a data message received over a network that is eligible for discard, comprising:

means for receiving at least at a first node and a second node over said network, at least one beacon message transmitted from a beacon node, said at least one beacon message containing a beacon sequence number;

means for generating at said first node, a local sequence number based upon the beacon sequence number in the at least one beacon messages received at said first node;

means for receiving at said first node a data message from said second node, said data message including a receive sequence number, said receive sequence number derived from one of said at least one beacon messages transmitted by said beacon node and stored in said data message by said second node; and means for identifying said data message as eligible for discard if said first node local sequence number exceeds said receive sequence number by a predetermined value.

* * * * *